US012570189B2

(12) United States Patent
Mo

(10) Patent No.: US 12,570,189 B2
(45) Date of Patent: Mar. 10, 2026

(54) SAFETY SEAT BASE

(71) Applicant: Wonderland Switzerland AG, Steinhausen (CH)

(72) Inventor: Xiaolong Mo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 192 days.

(21) Appl. No.: 18/564,382

(22) PCT Filed: Jun. 1, 2022

(86) PCT No.: PCT/EP2022/064927
§ 371 (c)(1),
(2) Date: Nov. 27, 2023

(87) PCT Pub. No.: WO2022/253902
PCT Pub. Date: Dec. 8, 2022

(65) Prior Publication Data
US 2024/0246461 A1 Jul. 25, 2024

(30) Foreign Application Priority Data

Jun. 1, 2021 (CN) .......................... 202110607239.5

(51) Int. Cl.
*B60N 2/28* (2006.01)
*B60N 2/90* (2018.01)
(52) U.S. Cl.
CPC ...... *B60N 2/2821* (2013.01); *B60N 2002/981* (2018.02)

(58) Field of Classification Search
CPC ................ B60N 2/2821; B60N 2/2824; B60N 2002/981; B60N 2/015
See application file for complete search history.

(56) References Cited

U.S. PATENT DOCUMENTS 9,221,368 B2 * 12/2015 Hou ..................... B60N 2/2845
2014/0300155 A1 10/2014 Lehman et al.

FOREIGN PATENT DOCUMENTS

| CN | 202071722 U | 12/2011 |
| CN | 102729854 A | 10/2012 |
| CN | 103042953 A | 4/2013 |
| CN | 203267824 U | 11/2013 |
| CN | 103507671 A | 1/2014 |
| CN | 204077432 U | 1/2015 |

(Continued)

OTHER PUBLICATIONS

International Search Report and Written Opinion for Application No. PCT/EP2022/064927 dated Sep. 14, 2022.

(Continued)

*Primary Examiner* — Milton Nelson, Jr.
(74) *Attorney, Agent, or Firm* — Volpe Koenig

(57) ABSTRACT
A safety seat base includes a base body, an indicating member and a support foot. The base body includes a frame. The frame has an indicating window. The indicating member is rotatably connected to the frame. The indicating member has a first color block. The support foot is rotatably connected to the frame. The support foot a protruding portion. When the support foot rotates to an unfolded position, the protruding portion pushes the indicating member to rotate upward, such that the indicating window shows the first color block.

13 Claims, 12 Drawing Sheets

(56)　　　　　　References Cited

FOREIGN PATENT DOCUMENTS

| CN | 205215204 U | | 5/2016 |
|---|---|---|---|
| CN | 106740312 A | | 5/2017 |
| CN | 109398174 A | | 3/2019 |
| CN | 109606215 A | | 4/2019 |
| CN | 210918634 U | | 7/2020 |
| CN | 211543324 U | * | 9/2020 |
| CN | 112314226 A | | 2/2021 |
| CN | 112644417 A | | 4/2021 |
| EP | 2210769 A2 | | 7/2010 |
| GB | 2490414 A | | 10/2012 |
| JP | 2005186907 A | | 7/2005 |

OTHER PUBLICATIONS

Office Action issued in corresponding Taiwanese Application No. 111120036 dated Dec. 19, 2022.

Office Action issued in corresponding Taiwanese Application No. 111120036 dated Jul. 6, 2023.

"Notice of Allowance Issued in Corresponding Chinese Patent Application No. 202110607239.5", Mailed Date: Feb. 25, 2025, 5 pages.

Office Action issued in corresponding Chinese Application No. 202110607239.5 dated Jun. 28, 2024.

* cited by examiner

SAFETY SEAT BASE

CROSS-REFERENCE TO RELATED APPLICATIONS

The present application is a national phase application under 35 U.S.C. 371 of International Application No. PCT/EP2022/064927 filed on Jun. 1, 2022, which claims priority to CN 202110607239.5 filed on Jun. 1, 2021, the entire contents of which are incorporated herein by reference.

FIELD OF THE INVENTION

The present disclosure relates to a safety seat base, particularly a safety seat base driving an indicating member to rotate by rotating a support foot.

BACKGROUND OF THE INVENTION

At present, some safety seat bases are equipped with a support foot. When the safety seat base is disposed on a vehicle seat, the support foot abuts against a floor of the vehicle. Thus, when the vehicle is hit, the support foot supports the safety seat base to prevent the safety seat base from tipping forward or overturning. In general, there is an indicating structure disposed on the support foot for indicating whether the support foot has been unfolded completely. A conventional indicating structure is disposed at the bottom of the support foot. Since the position of this indicating structure is lower, it is inconvenient for a user to see. Some indicating structures are disposed on the top of the support foot. In this indicating structure, an indicating member is driven by moving the whole support foot or moving the upper and lower tubes of the support foot relatively. Thus, there will be relative shaking between the support foot and the safety seat base or between two tubes of the support foot, thereby generating noise.

SUMMARY OF THE INVENTION

The present disclosure aims at providing a safety seat base driving an indicating member to rotate by rotating a support foot, thereby resolving the aforesaid problems.

This is achieved by a safety seat base according to claim 1. The dependent claims pertain to corresponding further developments and improvements.

As will be seen more clearly from the detailed description following below, the claimed safety seat base includes a base body, an indicating member and a support foot. The base body includes a frame. The frame has an indicating window. The indicating member is rotatably connected to the frame. The indicating member has a first color block. The support foot is rotatably connected to the frame. The support foot has a protruding portion. When the support foot rotates to an unfolded position, the protruding portion pushes the indicating member to rotate upward, such that the indicating window shows the first color block.

Preferably, when the support foot rotates away from the unfolded position, the indicating member rotates downward, such that the first color block disappears from the indicating window.

Preferably, the indicating member further has a second color block and the first color block is different from the second color block. When the support foot rotates away from the unfolded position, the indicating member rotates downward, such that the indicating window shows the second color block.

Preferably, when the support foot is unfolded incompletely, the indicating window shows a part of the first block and a part of the second color block.

Preferably, the support foot includes a cover and the protruding portion protrudes from a side of the cover.

Preferably, the safety seat base further includes a torsion spring, two ends of the torsion spring respectively abut against the support foot and the frame, and the torsion spring biases the support foot toward the unfolded position.

Preferably, the safety seat base further includes an elastic sheet, the elastic sheet is disposed on the frame, and the elastic sheet restrains the support foot from rotating toward the unfolded position.

Preferably, the safety seat base further includes an alarm device and the alarm device is disposed on the base body. When the support foot is unfolded incompletely, the alarm device sends out an alarm message. When the support foot is unfolded completely, the elastic sheet triggers the alarm device to stop sending out the alarm message.

Preferably, the frame has a first restraining portion, the indicating member has a second restraining portion, and the first restraining portion cooperates with the second restraining portion to restrain the indicating member from rotating downward.

Preferably, the safety seat base further includes an alarm device and the alarm device is disposed on the base body. When the support foot is unfolded incompletely, the alarm device sends out an alarm message. When the support foot is unfolded completely, the alarm device stops sending out the alarm message.

Preferably, when the support foot is unfolded completely, the indicating member triggers the alarm device to stop sending out the alarm message.

Preferably, the support foot includes a first support member, a second support member, a fixing socket and a lock member. The first support member is rotatably connected to the frame. The second support member is telescopically connected to the first support member. The second support member has a plurality of engaging holes. The fixing socket is disposed on the first support member. The lock member is rotatably connected to the fixing socket. The lock member has an engaging portion and an operating portion. The engaging portion engages with one of the engaging holes to lock the first support member and the second support member. When the operating portion is pressed, the engaging portion disengages from the engaging hole, such that the second support member is able to move with respect to the first support member.

Preferably, the support foot further includes a torsion spring, the torsion spring is disposed in the fixing socket, and two ends of the torsion spring respectively abut against the first support member and the fixing socket.

As mentioned in the above, the disclosure disposes the indicating window on the frame of the base body and the indicating window is located at the top of the support foot, such that it is convenient for a user to see. The present disclosure drives the indicating member to rotate by rotating the support foot. Thus, the support foot will not shake and will not generate noise. Furthermore, the present disclosure may send out the alarm message by the alarm device to indicate whether the support foot has been unfolded completely. Accordingly, the user may also know whether the support foot has been unfolded completely through the alarm device. If the support foot has been unfolded completely before abutting against the floor of a vehicle, the user may mistakenly believe that the safety seat base has been properly assembled to the vehicle seat, thereby causing danger. Therefore, the present disclosure may utilize the elastic sheet to restrain the support foot from rotating toward the unfolded position. Only when the support foot abuts against the floor of the vehicle, the support foot overcomes an elastic force of the elastic sheet and then rotates to the unfolded position. Accordingly, the present disclosure can prevent the support foot from being unfolded completely before abutting against the floor of the vehicle, so as to ensure that the safety seat base is properly assembled.

BRIEF DESCRIPTION OF THE DRAWINGS

In the following, the present disclosure is further illustrated by way of example, taking reference to the accompanying drawings thereof.

DETAILED DESCRIPTION

Figure 1:
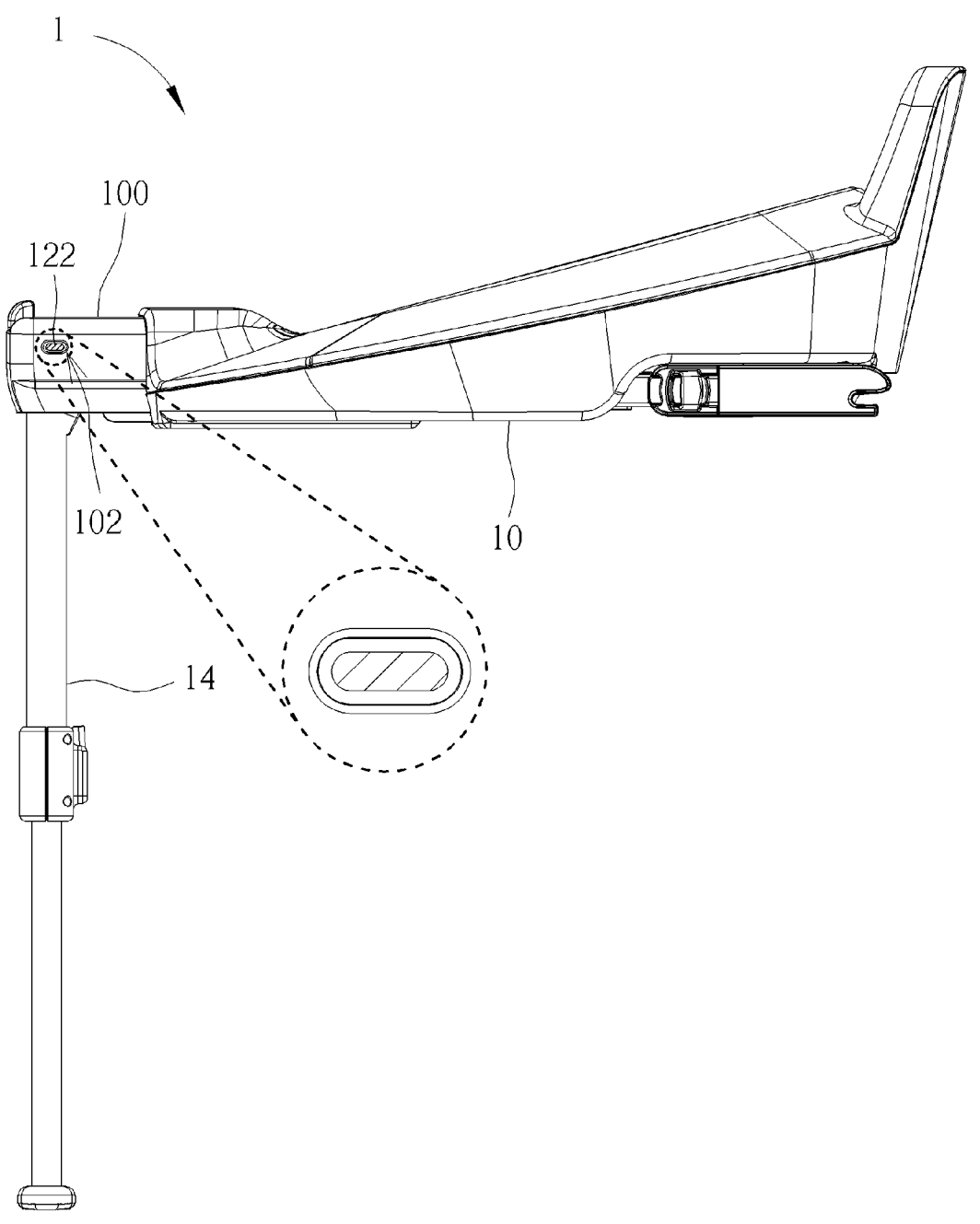
FIG. 1 is a side view illustrating a safety seat base according to an embodiment of the present disclosure.
Figure 2:
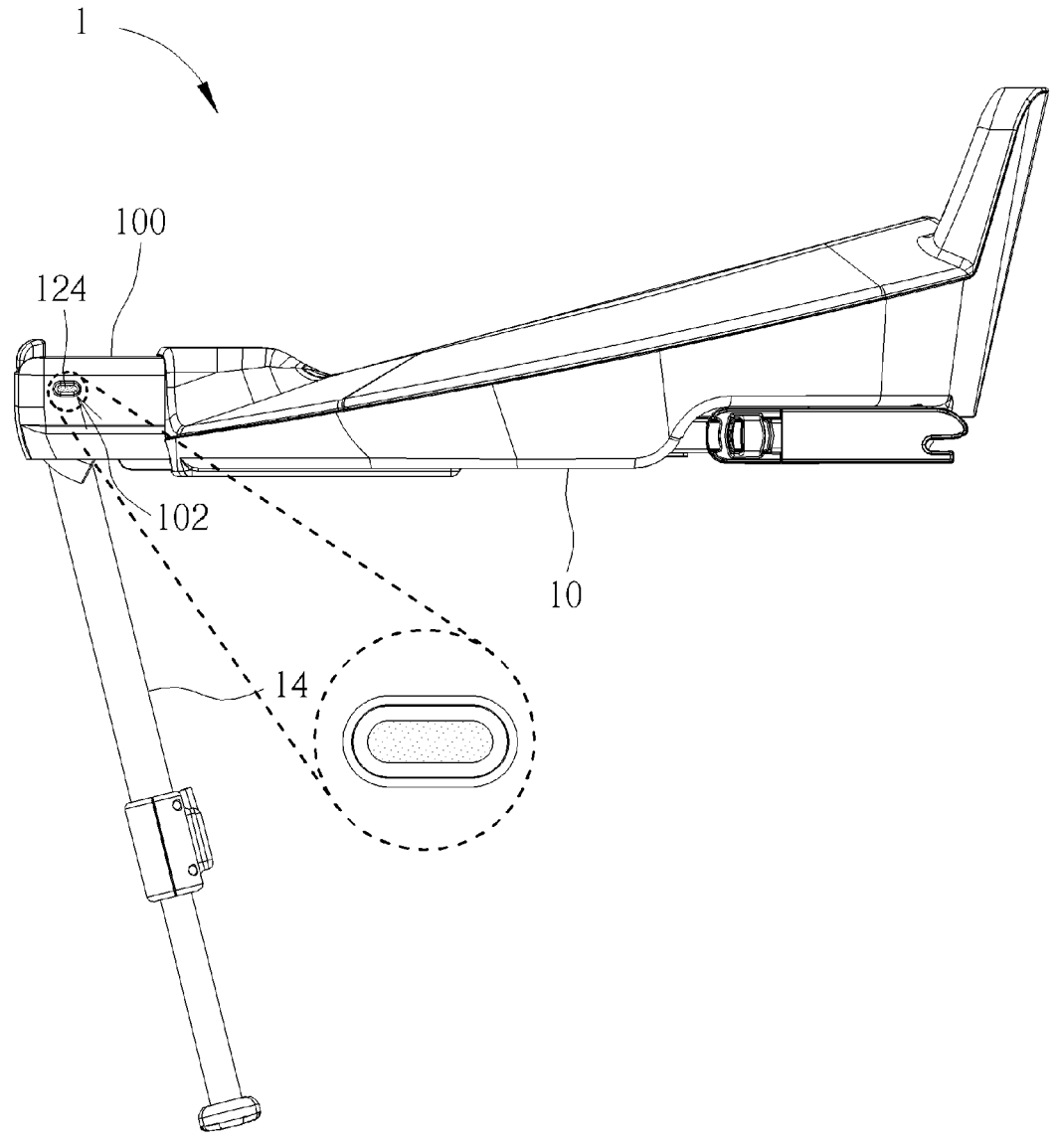
FIG. 2 is a side view illustrating a support foot shown in FIG. 1 rotating away from an unfolded position.
Figure 3:
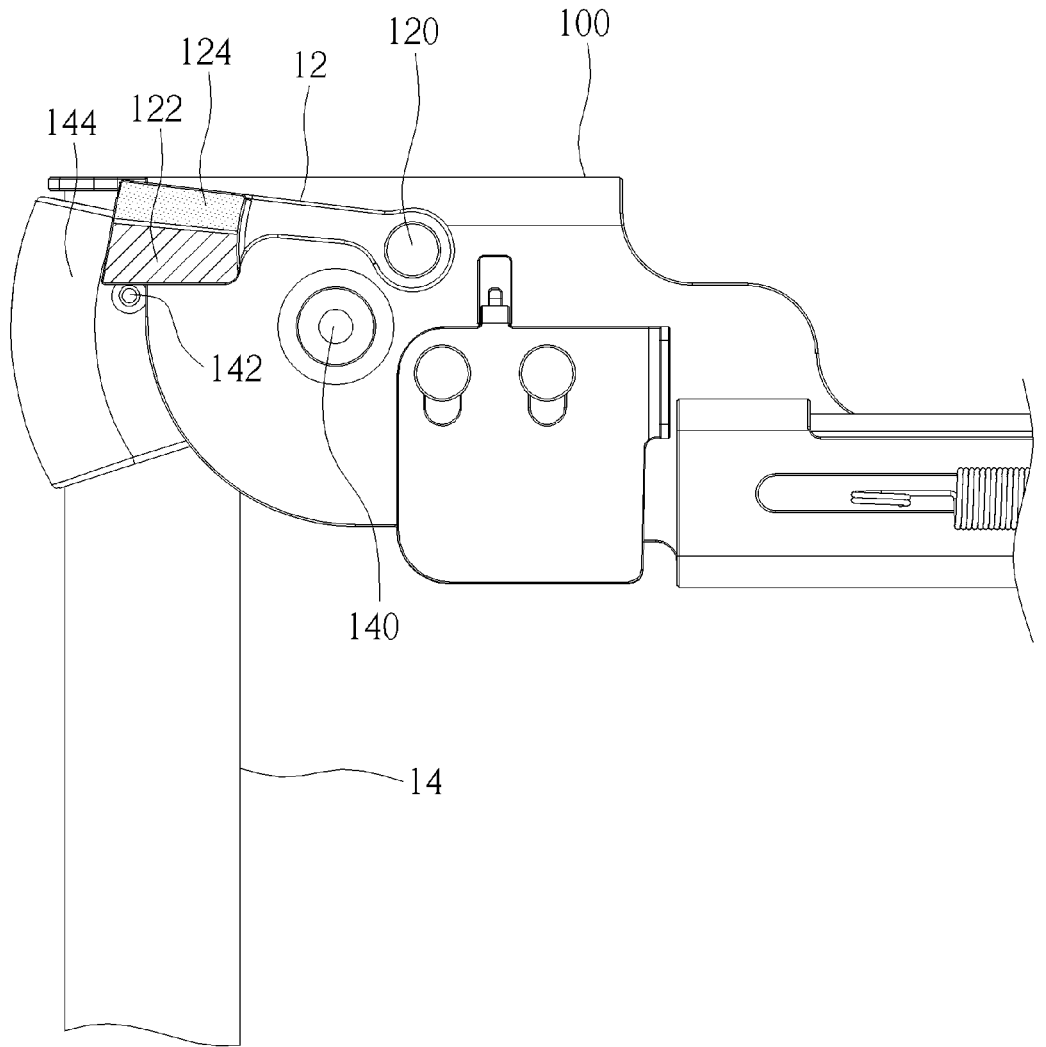
FIG. 3 is a side view illustrating the relative positions of the support foot shown in FIG. 1 and an indicating member.
Figure 4:
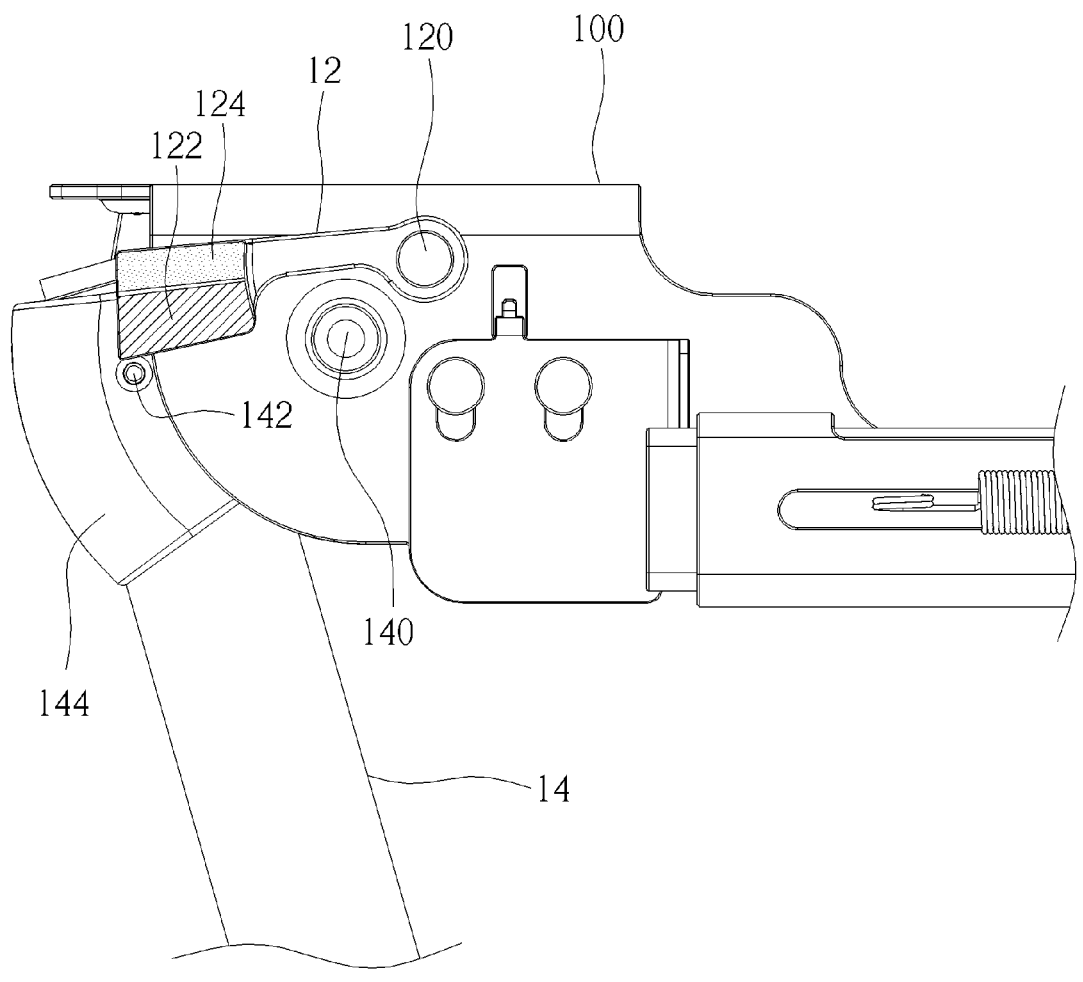
FIG. 4 is a side view illustrating the relative positions of the support foot shown in FIG. 2 and the indicating member.
Figure 5:
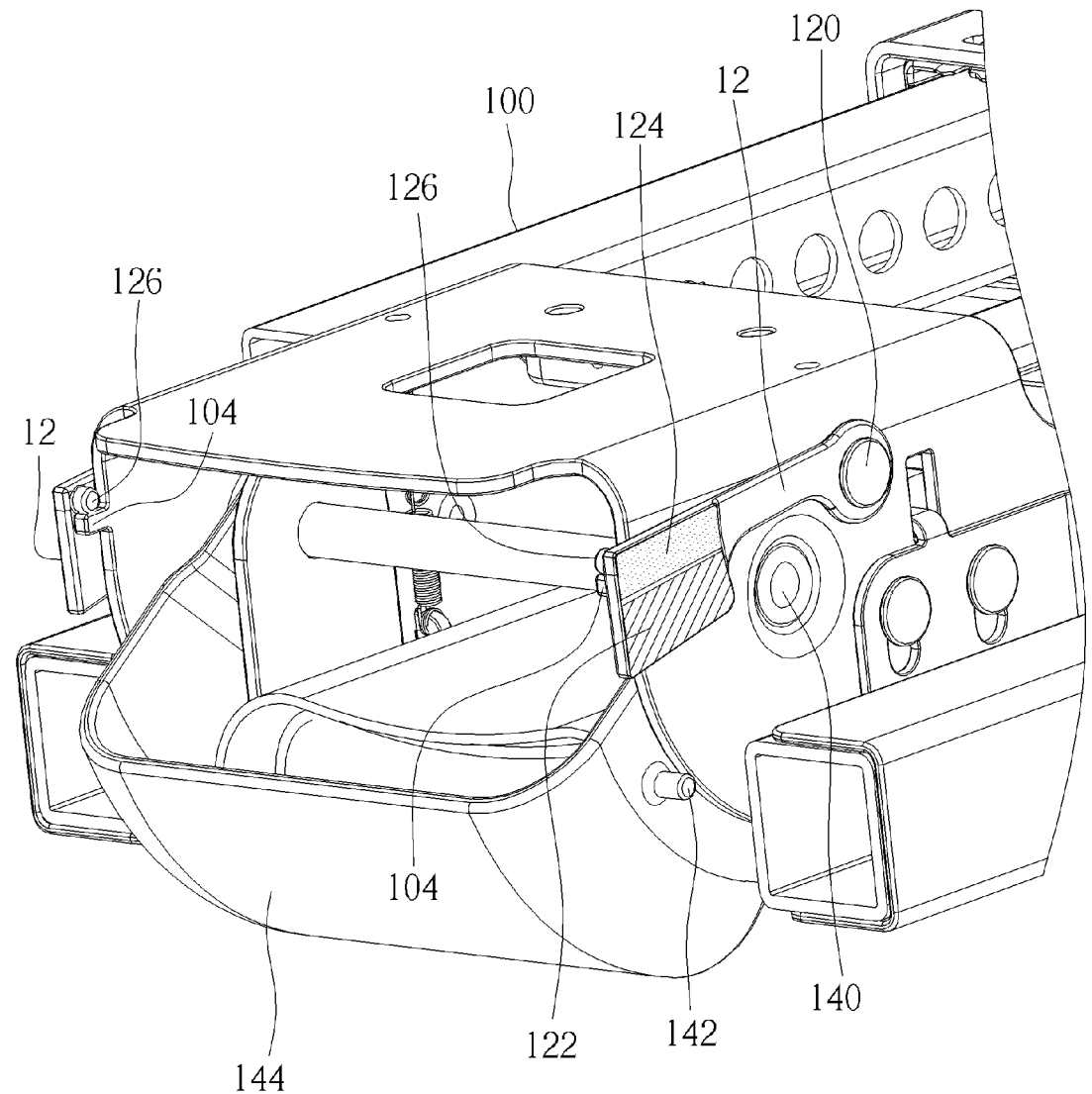
FIG. 5 is a perspective view illustrating a frame and the indicating member.

Referring to FIGS. 1 to 5, FIG. 1 is a side view illustrating a safety seat base 1 according to an embodiment of the present disclosure, FIG. 2 is a side view illustrating a support foot 14 shown in FIG. 1 rotating away from an unfolded position, FIG. 3 is a side view illustrating the relative positions of the support foot 14 shown in FIG. 1 and an indicating member 12, FIG. 4 is a side view illustrating the relative positions of the support foot 14 shown in FIG. 2 and the indicating member 12, and FIG. 5 is a perspective view illustrating a frame 100 and the indicating member 12.

As shown in FIGS. 1 to 4, the safety seat base 1 of the present disclosure includes a base body 10, an indicating member 12 and a support foot 14. The base body 10 of the safety seat base 1 may be disposed on a vehicle seat. A user may rotate the support foot 14 to an unfolded position shown in FIG. 1, such that the support foot 14 abuts against a floor of the vehicle. Thus, when the vehicle is hit, the support foot 14 can support the safety seat base 1 to prevent the safety seat base 1 from tipping forward or overturning. When the safety seat base 1 is detached from the vehicle seat, the user may rotate the support foot 14 away from the unfolded position (as shown in FIG. 2) to fold the support foot 14.

As shown in FIGS. 1 and 2, the base body 10 includes a frame 100 and the frame 100 has an indicating window 102. As shown in FIGS. 3 and 4, the indicating member 12 is rotatably connected to the frame 100. In this embodiment, the indicating member 12 may be rotatably connected to the frame 100 by a pivot 120. The indicating member 12 has a first color block 122 and a second color block 124, wherein the first color block 122 is different from the second color block 124. In practical applications, the first color block 122 may be green and the second color block 124 may be red, but the present disclosure is not so limited. The first color block 122 and the second color block 124 may be other different colors according to practical applications. Furthermore, as shown in FIG. 5, the present disclosure may dispose two indicating members 12 at opposite sides of the frame 100. The indicating window 102 of the frame 100 is configured to show the color block of the indicating member 12. Thus, when there are two indicating members 12 disposed at opposite sides of the frame 100, the opposite sides of the frame 100 have two indicating windows 102 correspondingly. Needless to say, the present disclosure may also dispose one single indicating member 12 at one side of the frame 100. At this time, the side of the frame 100 has one single indicating window 102 correspondingly.

As shown in FIGS. 3 and 4, the support foot 14 is rotatably connected to the frame 100. In this embodiment, the support foot 14 may be rotatably connected to the frame 100 by a pivot 140. The support foot 14 has a protruding portion 142. In this embodiment, the support foot 14 may include a cover, such as a decorative cover 144, and the protruding portion 142 may protrude from a side of the decorative cover 144. The protruding portion 142 is configured to push the indicating member 12 to rotate. Thus, when there are two indicating members 12 disposed at opposite sides of the frame 100, opposite sides of the support foot 14 have two protruding portions correspondingly.

As shown in FIGS. 1 and 3, when the support foot 14 rotates to the unfolded position, the protruding portion 142 of the support foot 14 pushes the indicating member 12 to rotate upward. At this time, the first color block 122 of the indicating member 12 is aligned with the indicating window 102, such that the indicating window 102 shows the first color block 122. As shown in FIGS. 2 and 4, when the support foot 14 rotates away from the unfolded position, the indicating member 12 rotates downward due to its own weight. At this time, the second color block 124 of the indicating member 12 is aligned with the indicating window 102, such that the indicating window 102 shows the second color block 124. Accordingly, when the user sees the first color block 122 shown in the indicating window 102, it means that the support foot 14 has rotated to the unfolded position. On the other hand, when the user sees the second color block 124 shown in the indicating window 102, it means that the support foot 14 has not rotated to the unfolded position yet. It should be noted that when the support foot 14 approaches the unfolded position without being unfolded completely, the indicating window 102 shows a part of the first block 122 and a part of the second color block 124. At this time, it means that the support foot 14 has not rotated to the unfolded position yet, i.e. the support foot 14 has not abutted against the floor of the vehicle.

As shown in FIG. 5, the frame 100 may have a first restraining portion 104 and the indicating member 12 may have a second restraining portion 126. The first restraining portion 104 cooperates with the second restraining portion 126 to restrain the indicating member 12 from rotating downward. Thus, when the support foot 14 rotates away from the unfolded position (e.g. rotates to a folded position), the indicating member 12 rotates downward to the position shown in FIG. 5 due to its own weight. At this time, the first restraining portion 104 blocks the second restraining portion 126 to restrain the indicating member 12 from rotating downward continuously. When the indicating member 12 is located at the position shown in FIG. 5, the second color block 124 of the indicating member 12 is aligned with the indicating window 102, such that the indicating window 102 shows the second color block 124 (as shown in FIG. 2).

Figure 6:
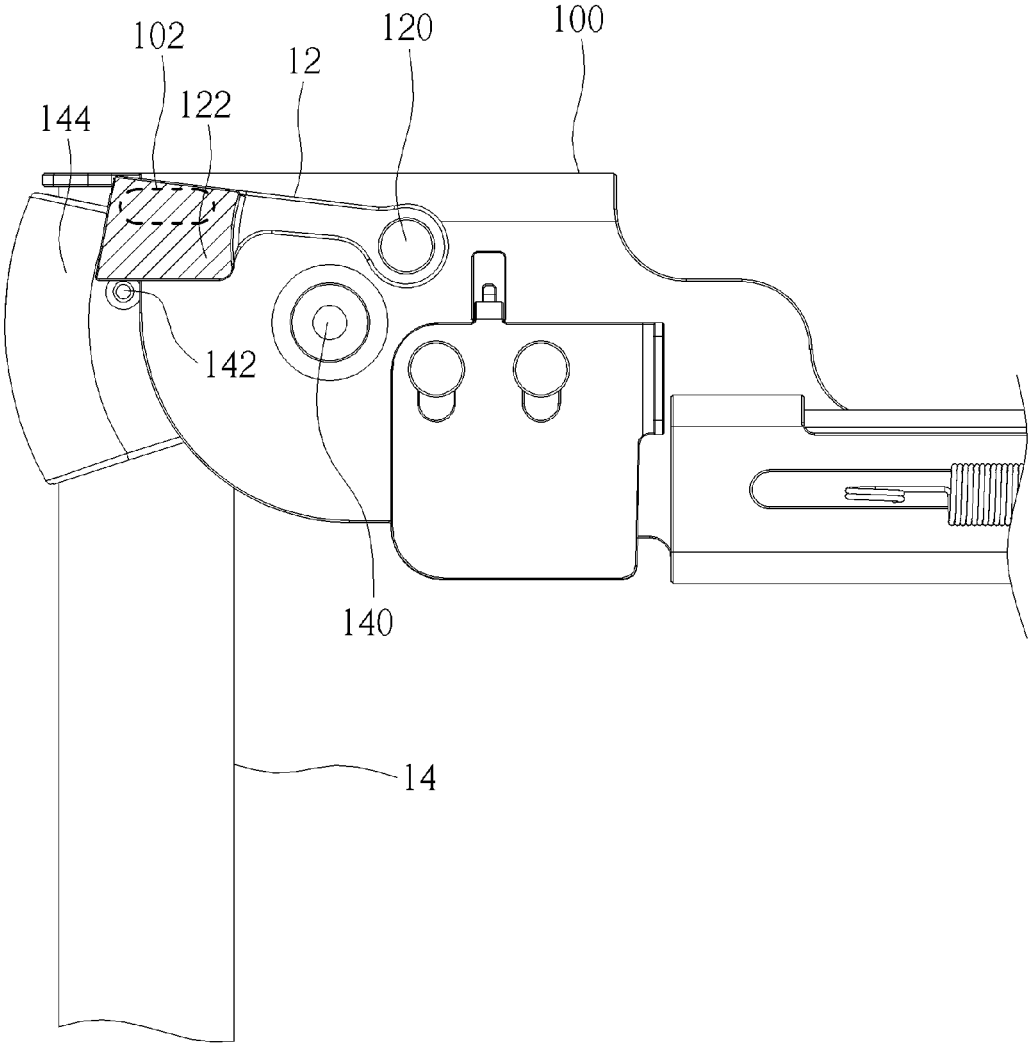
FIG. 6 is a side view illustrating the relative positions of the support foot and the indicating member according to another embodiment of the present disclosure.
Figure 7:
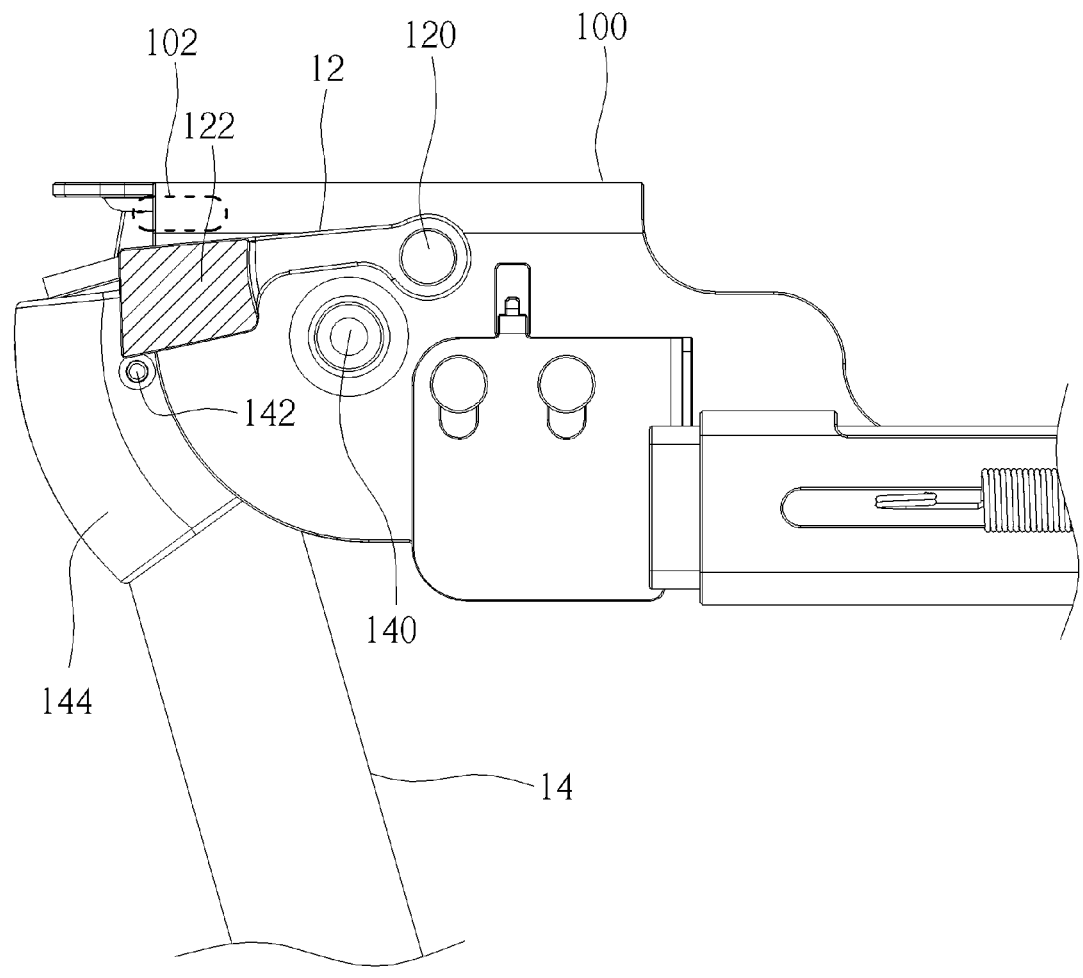
FIG. 7 is another side view illustrating the relative positions of the support foot and the indicating member shown in FIG. 6.

Referring to FIGS. 6 and 7, FIG. 6 is a side view illustrating the relative positions of the support foot 14 and the indicating member 12 according to another embodiment of the present disclosure, and FIG. 7 is another side view illustrating the relative positions of the support foot 14 and the indicating member 12 shown in FIG. 6.

As shown in FIGS. 6 and 7, the indicating member 12 may only have the first color block 122 without the second color block 124. As shown in FIG. 6, when the support foot 14 rotates to the unfolded position, the protruding portion 142 of the support foot 14 pushes the indicating member 12 to rotate upward. At this time, the first color block 122 of the indicating member 12 is aligned with the indicating window 102, such that the indicating window 102 shows the first color block 122. As shown in FIG. 7, when the support foot 14 rotates away from the unfolded position, the indicating member 12 rotates downward due to its own weight, such that the first color block 122 disappears from the indicating window 102. Accordingly, when the user sees the first color block 122 shown in the indicating window 102, it means that the support foot 14 has rotated to the unfolded position. On the other hand, when the user sees no first color block 122 shown in the indicating window 102, it means that the support foot 14 has not rotated to the unfolded position yet.

Figure 8:
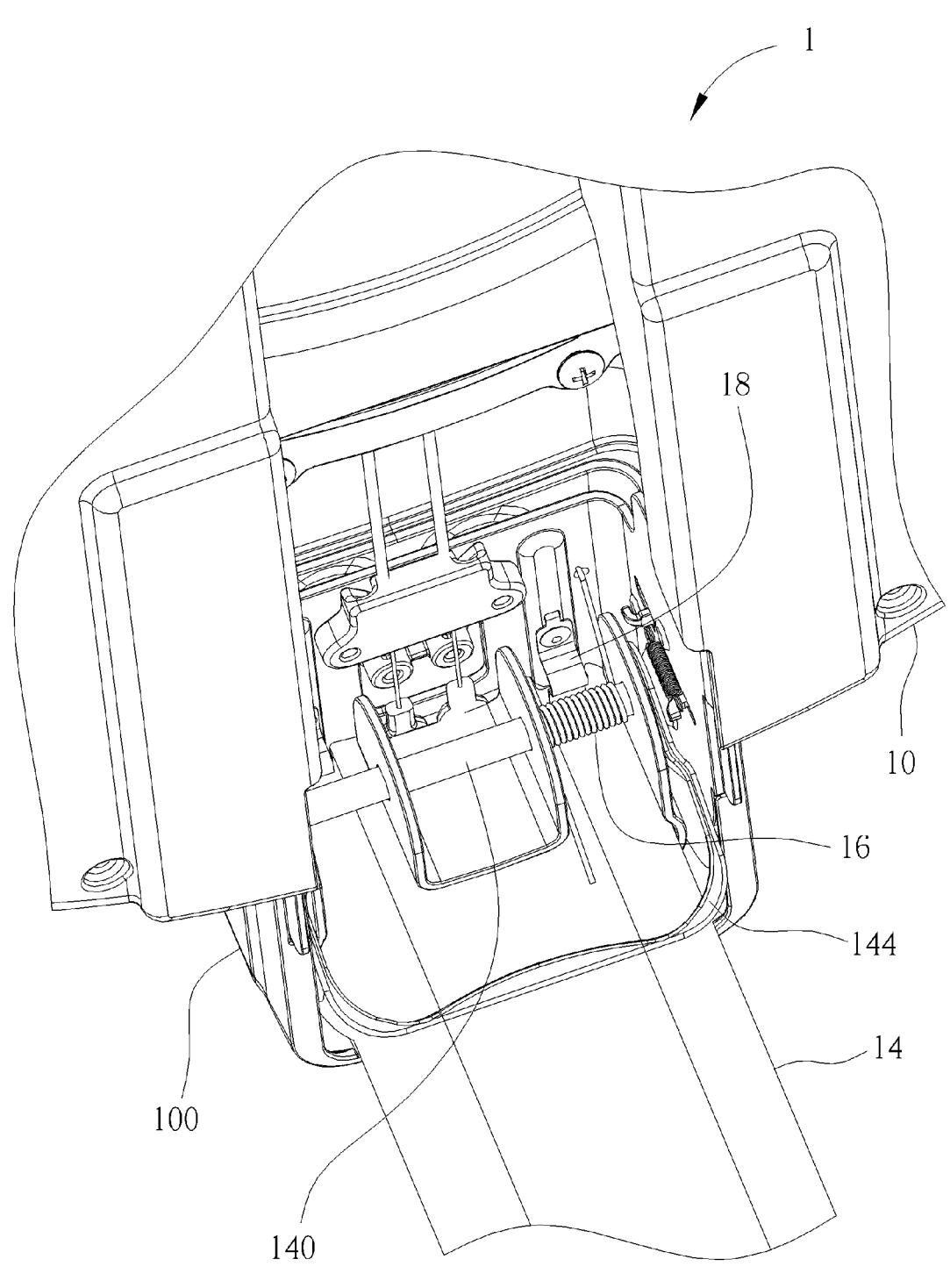
FIG. 8 is a partial bottom view illustrating the safety seat base shown in FIG. 1.
Figure 9:
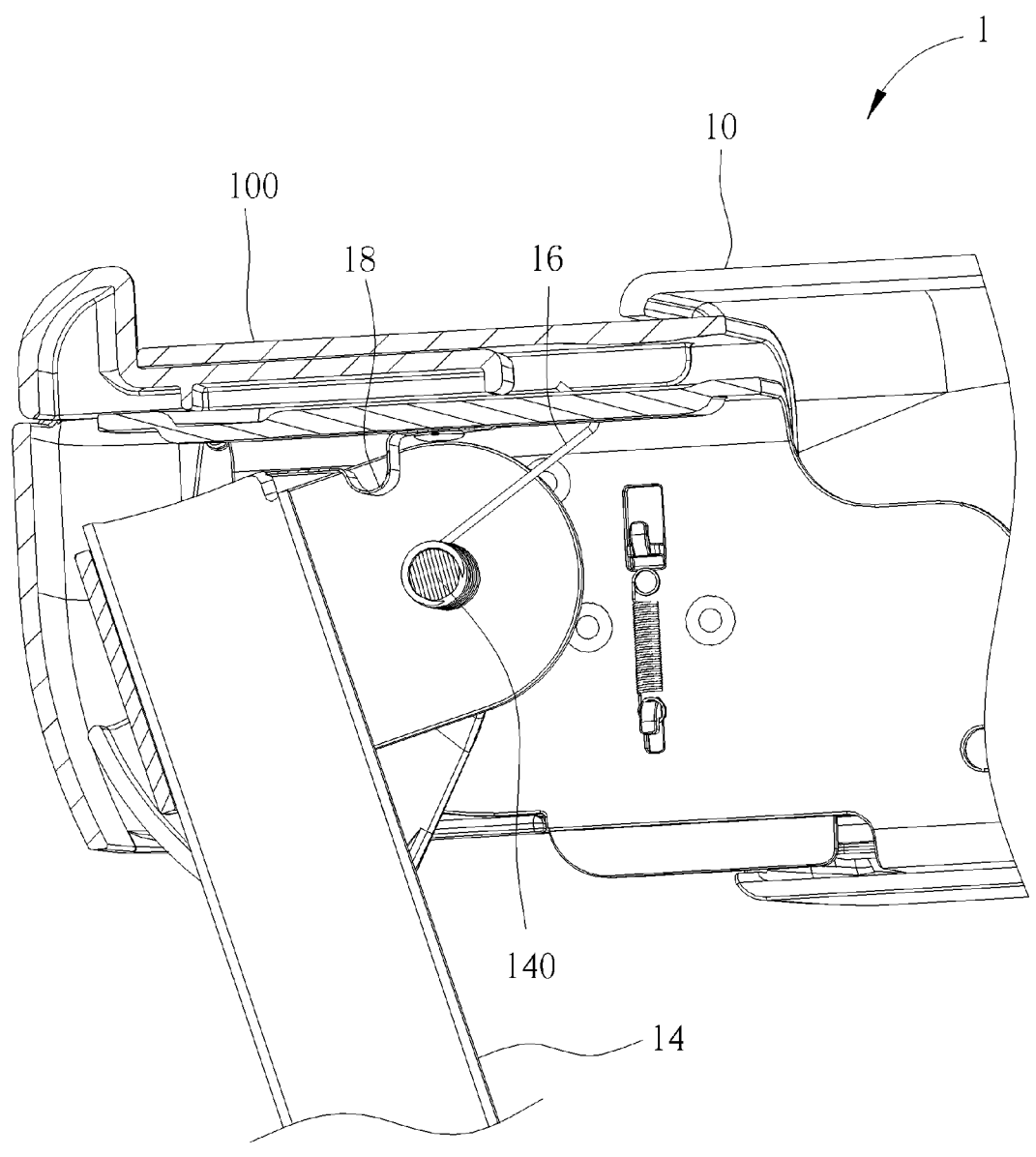
FIG. 9 is a partial sectional view illustrating the safety seat base shown in FIG. 1.

Referring to FIGS. 8 and 9, FIG. 8 is a partial bottom view illustrating the safety seat base 1 shown in FIG. 1, and FIG. 9 is a partial sectional view illustrating the safety seat base 1 shown in FIG. 1.

As shown in FIGS. 8 and 9, the safety seat base 1 may further include a torsion spring 16. In this embodiment, the torsion spring 16 may be disposed on the pivot 140 and two ends of the torsion spring 16 respectively abut against the support foot 14) and the frame 100. The torsion spring 16 may bias the support foot 14 toward the unfolded position shown in FIG. 1, such that the user may rotate the support foot 14 to the unfolded position with less force. It should be noted that if the support foot 14 has been unfolded completely due to the bias of the torsion spring 16 before abutting against the floor of the vehicle, the user may mistakenly believe that the safety seat base 1 has been properly assembled to the vehicle seat, thereby causing danger. To avoid the aforesaid situation, the safety seat base 1 may further include an elastic sheet 18. The clastic sheet 18 is disposed on the frame 100. When the support foot 14 is biased by the torsion spring 16 to the position shown in FIG. 9, an upper end of the support foot 14 is in contact with the clastic sheet 18. At this time, the elastic sheet 18 restrains the support foot 14 from rotating toward the unfolded position continuously. Only when the support foot 14 abuts against the floor of the vehicle, the support foot 14 overcomes an elastic force of the elastic sheet 18 and then rotates to the unfolded position. Accordingly, the present disclosure can prevent the support foot 14 from being unfolded completely before abutting against the floor of the vehicle, so as to ensure that the safety seat base 1 is properly assembled.

Figure 10:
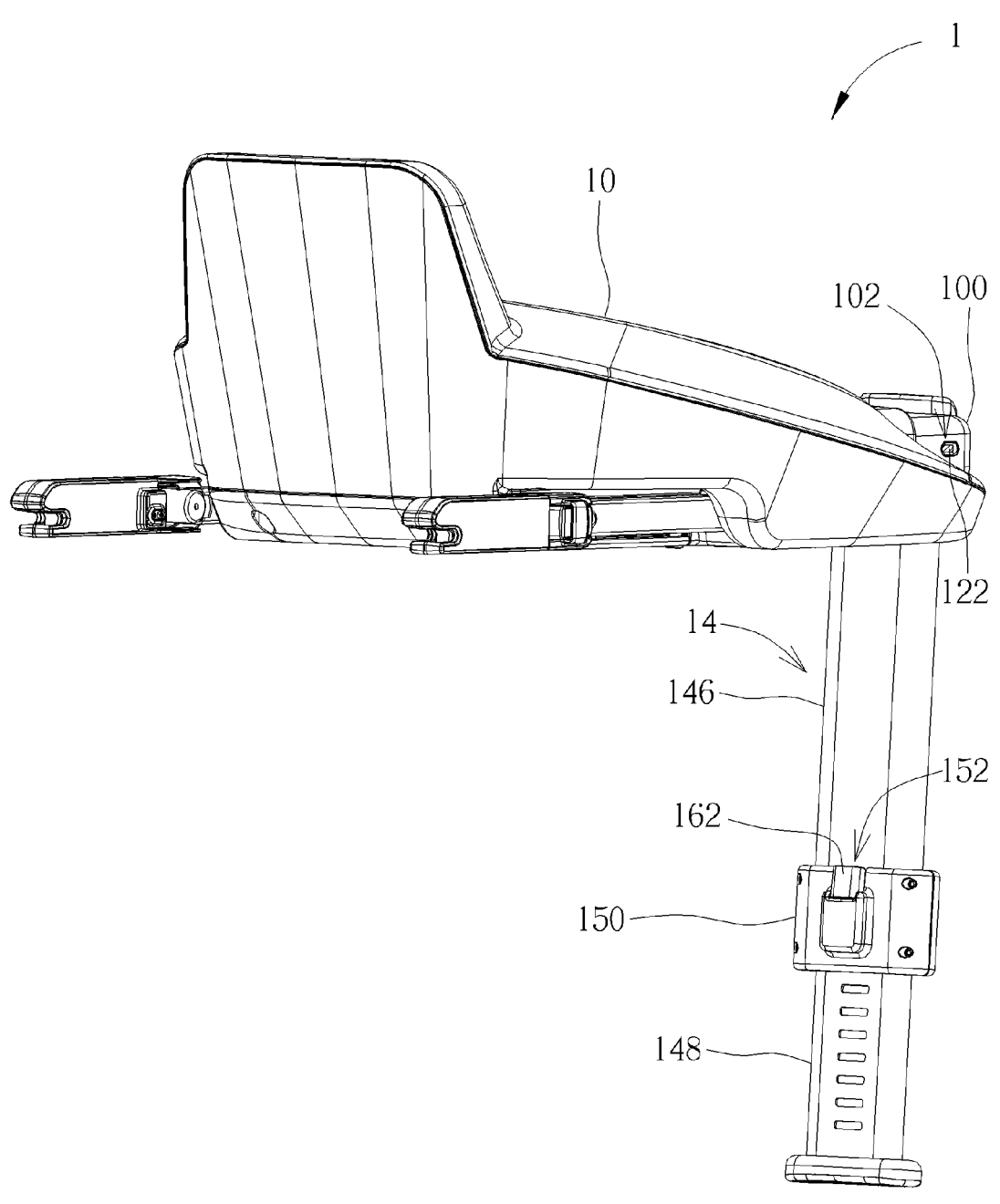
FIG. 10 is a perspective view illustrating the safety seat base shown in FIG. 1.
Figure 11:
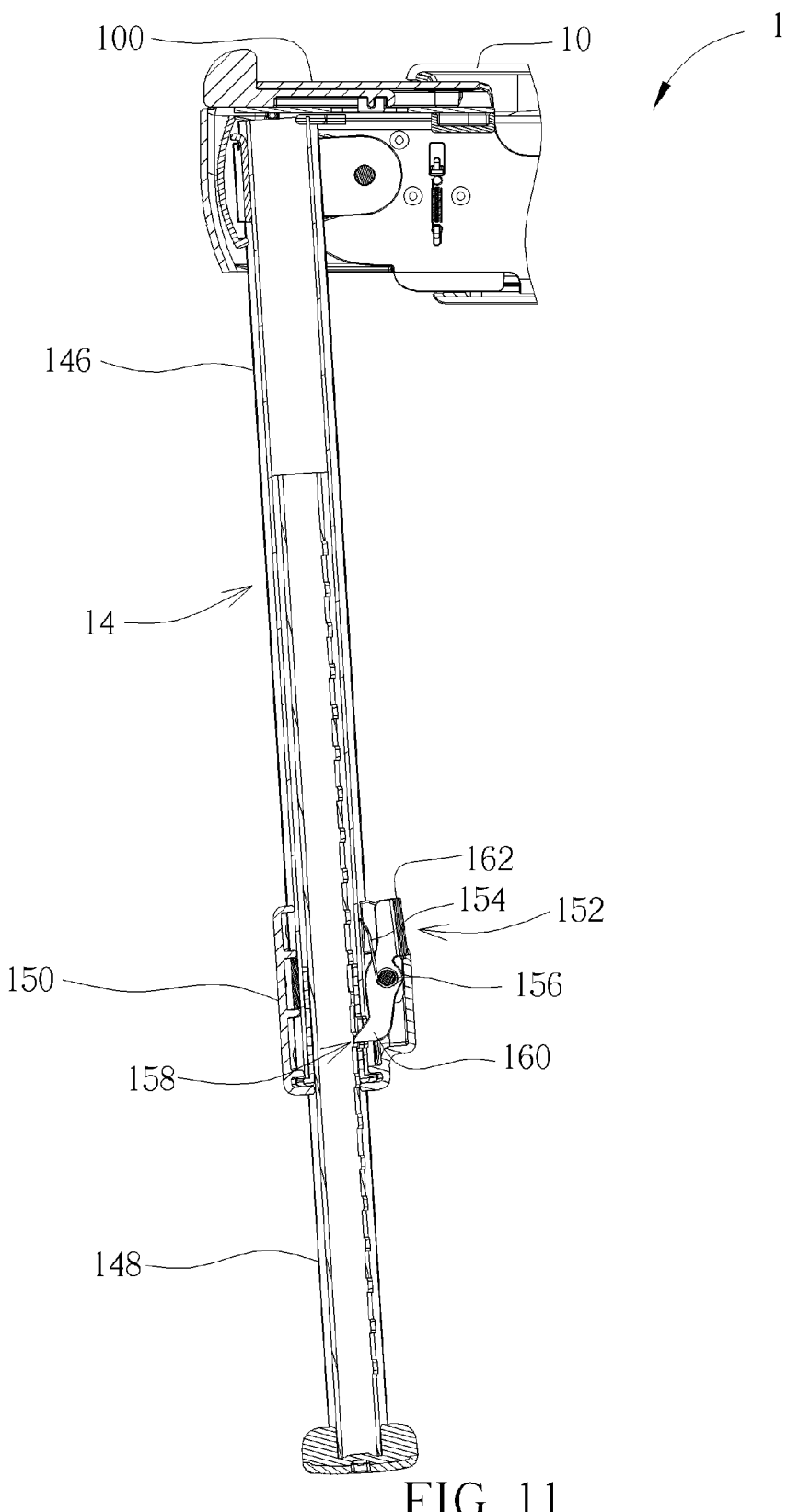
FIG. 11 is a sectional view illustrating the support foot shown in FIG. 10.

Referring to FIGS. 10 and 11, FIG. 10 is a perspective view illustrating the safety seat base 1 shown in FIG. 1, and FIG. 11 is a sectional view illustrating the support foot 14 shown in FIG. 10.

As shown in FIGS. 10 and 11, the support foot 14 may include a first support member 146, a second support member 148, a fixing socket 150, a lock member 152 and a torsion spring 154. The first support member 146 is rotatably connected to the frame 100. The second support member 148 is telescopically connected to the first support member 146. The fixing socket 150 is disposed on the first support member 146. The lock member 152 is rotatably connected to the fixing socket 150. In this embodiment, the lock member 152 may be rotatably connected to the fixing socket 150 by a pivot 156. The torsion spring 154 is disposed in the fixing socket 150. In this embodiment, the torsion spring 154 may be disposed on the pivot 156 and two ends of the torsion spring 154 respectively abut against the first support member 146 and the fixing socket 150.

As shown in FIGS. 10 and 11, the second support member 148 has a plurality of engaging holes 158 and the lock member 152 has an engaging portion 160 and an operating portion 162. The engaging portion 160 of the lock member 152 may engage with one of the engaging holes 158 to lock the first support member 146 and the second support member 148. When a user wants to adjust the length of the support foot 14, the user may press the operating portion 162 of the lock member 152. When the operating portion 162 of the lock member 152 is pressed, the engaging portion 160 disengages from the engaging hole 158, such that the second support member 148 is able to move with respect to the first support member 146 to adjust the length of the support foot 14. After the length of the support foot 14 is adjusted, the user may release the operating portion 162 of the lock member 152. At this time, the torsion spring 154 drives the lock member 152 to return, such that the engaging portion 160 of the lock member 152 engages with the corresponding engaging hole 158 again to lock the first support member 146 and the second support member 148. Since the length of the support foot 14 is adjustable, the safety seat base 1 of the present disclosure may be assembled in vehicles with different floor heights, such that it is more flexible in use.

Figure 12:
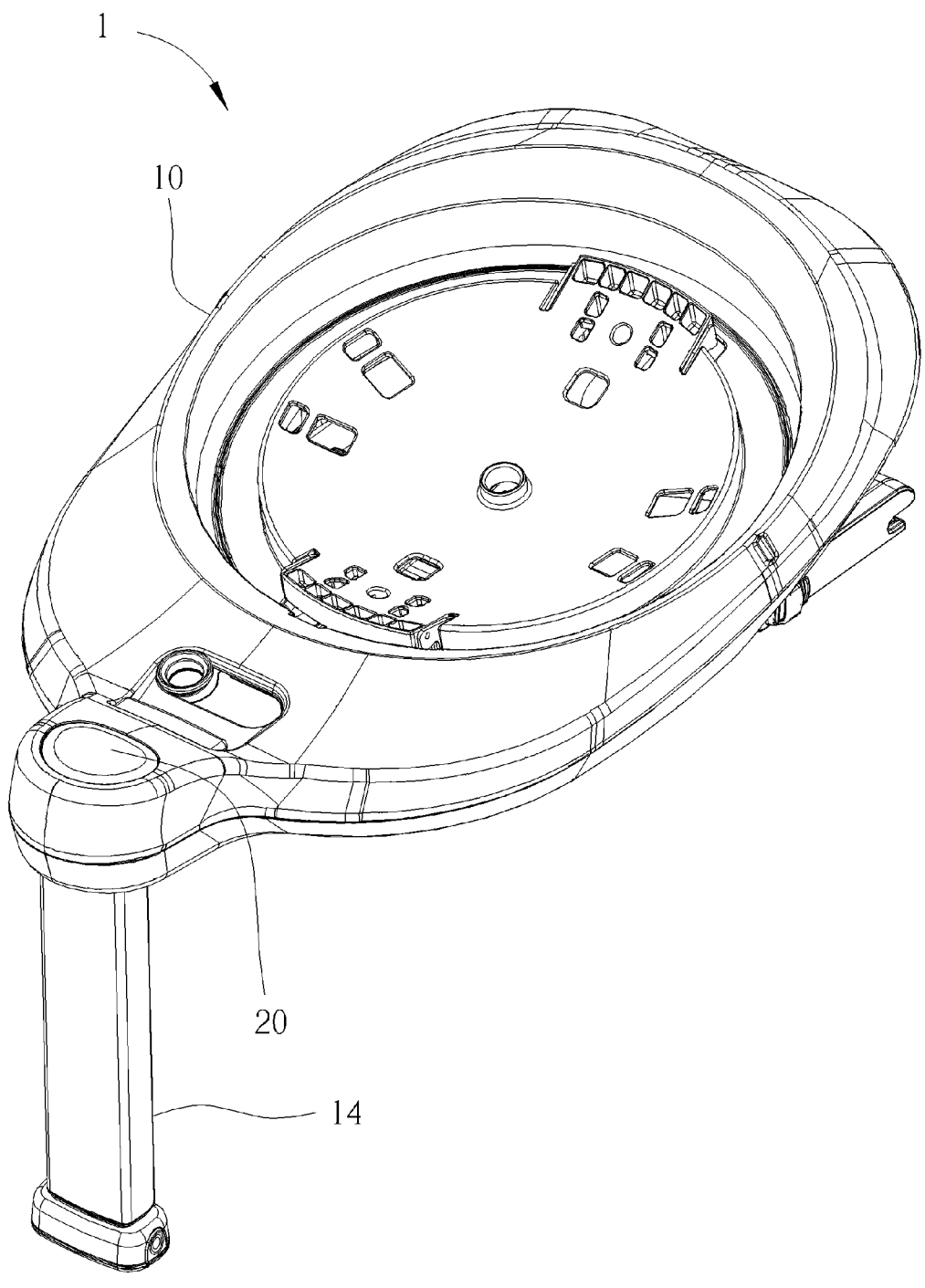
FIG. 12 is a perspective view illustrating the safety seat base according to another embodiment of the present disclosure.

Referring to FIG. 12, FIG. 12 is a perspective view illustrating the safety seat base 1 according to another embodiment of the present disclosure.

As shown in FIG. 12, the safety seat base 1 may further include an alarm device 20. The alarm device 20 is disposed on the base body 10. When the support foot 14 is unfolded incompletely, the alarm device 20 may send out an alarm message to notice the user. On the other hand, when the support foot 14 is unfolded completely, the alarm device 20 will stop sending out the alarm message. Accordingly, the user may know whether the support foot 14 has been unfolded completely through the alarm device 20. In an embodiment, the safety seat base 1 may be equipped with the aforesaid elastic sheet 18. Thus, when the support foot 14 is unfolded completely, the support foot 14 will push the clastic sheet 18 upward. At this time, the elastic sheet 18 may touch a circuit of the alarm device 20, such that the clastic sheet 18 triggers the alarm device 20 to stop sending out the alarm message. In another embodiment, when the support foot 14 is unfolded completely, the support foot 14 will push the aforesaid indicating member 12 upward. At this time, the indicating member 12 may touch the circuit of the alarm device 20, such that the indicating member 12 triggers the alarm device 20 to stop sending out the alarm message. Accordingly, the present disclosure may utilize the elastic sheet 18 or the indicating member 12 to trigger the alarm device 20 to stop sending out the alarm device according to practical applications. In practical applications, the alarm device 20 may be a display, a light source and/or a speaker, so the alarm message may be an image, text, symbol, light and/or sound.

It should be noted that the present disclosure may use the aforesaid indicating member 12 and/or alarm device 20 as an indicating structure for indicating whether the support foot 14 has been unfolded completely by rotating the support foot 14. For further explanation, in an embodiment, the present disclosure may use the aforesaid indicating member 12 as a mechanical indicating structure; in another embodiment, the present disclosure may use the aforesaid alarm device 20 as an electrical indicating structure; or in another embodiment, the present disclosure may simultaneously use the aforesaid indicating member 12 and alarm device 20 as a composite mechanical and electrical indicating structure. In other words, the present disclosure drives the indicating structure to indicate whether the support foot 14 has been unfolded completely by rotating the support foot 14, and the present disclosure may selectively use the aforesaid indicating member 12, alarm device 20 or a combination of the indicating member 12 and alarm device 20 as the indicating structure according to practical applications.

As mentioned in the above, the present disclosure disposes the indicating window on the frame of the base body and the indicating window is located at the top of the support foot, such that it is convenient for a user to see. The present disclosure drives the indicating member to rotate by rotating the support foot. Thus, the support foot will not shake and will not generate noise. Furthermore, the present disclosure may send out the alarm message by the alarm device to indicate whether the support foot has been unfolded completely. Accordingly, the user may also know whether the support foot has been unfolded completely through the alarm device. If the support foot has been unfolded completely before abutting against the floor of a vehicle, the user may mistakenly believe that the safety seat base has been properly assembled to the vehicle seat, thereby causing danger. Therefore, the present disclosure may utilize the elastic sheet to restrain the support foot from rotating toward the unfolded position. Only when the support foot abuts against the floor of the vehicle, the support foot overcomes an elastic force of the elastic sheet and then rotates to the unfolded position. Accordingly, the present disclosure can prevent the support foot from being unfolded completely before abutting against the floor of the vehicle, so as to ensure that the safety seat base is properly assembled.

The foregoing are only preferred embodiments of the present disclosure while the protection scope thereof is not limited to the above description. Any change or substitution within the technical scope disclosed by the present disclosure should be covered by the protection scope of the present disclosure.

The invention claimed is:

1. A safety seat base comprising:
   a base body comprising a frame, the frame having an indicating window;
   an indicating member rotatably connected to the frame, the indicating member including a first color block; and
   a support foot rotatably connected to the frame, the support foot having a protruding portion;
   wherein when the support foot rotates to an unfolded position, the protruding portion pushes the indicating member to rotate upward, such that the indicating window shows the first color block, wherein the indicating member further includes a second color block and the first color block is visually different from the second color block; when the support foot rotates away from the unfolded position, the indicating member rotates downward, such that the indicating window shows the second color block,
   wherein when the support foot is unfolded incompletely, the indicating window shows a part of the first block and a part of the second color block.

2. The safety seat base according to claim 1, wherein when the support foot rotates away from the unfolded position, the indicating member rotates downward, such that the first color block disappears from the indicating window.

3. The safety seat base according to claim 1, wherein the support foot comprises a first support member, a second support member, a fixing socket and a lock member, the first support member is rotatably connected to the frame, the second support member is telescopically connected to the first support member, the second support member has a plurality of engaging holes, the fixing socket is disposed on the first support member, the lock member is rotatably connected to the fixing socket, the lock member has an engaging portion and an operating portion, and the engaging portion engages with one of the engaging holes to lock the first support member and the second support member; when the operating portion is pressed, the engaging portion disengages from the engaging hole, such that the second support member is able to move with respect to the first support member.

4. The safety seat base according to claim 3, wherein the support foot further comprises a torsion spring, the torsion spring is disposed in the fixing socket, and two ends of the torsion spring respectively abut against the first support member and the fixing socket.

5. The safety seat base according to claim 1, wherein the support foot comprises a cover and the protruding portion protrudes from a side of the cover.

6. The safety seat base according to claim 1, further comprising a torsion spring, two ends of the torsion spring respectively abut against the support foot and the frame, and the torsion spring biases the support foot toward the unfolded position.

7. The safety seat base according to claim 1, further comprising an elastic sheet, the elastic sheet is disposed on the frame, and the elastic sheet restrains the support foot from rotating toward the unfolded position.

8. The safety seat base according to claim 7, further comprising an alarm device and the alarm device is disposed on the base body; when the support foot is unfolded incompletely, the alarm device sends out an alarm message; when the support foot is unfolded completely, the elastic sheet triggers the alarm device to stop sending out the alarm message.

9. The safety seat base according to claim 1, wherein the frame includes a first restraining portion, the indicating member includes a second restraining portion, and the first restraining portion cooperates with the second restraining portion to restrain the indicating member from rotating downward.

10. The safety seat base according to claim 1, further comprising an alarm device and the alarm device is disposed on the base body; when the support foot is unfolded incompletely, the alarm device sends out an alarm message; when the support foot is unfolded completely, the alarm device stops sending out the alarm message.

11. The safety seat base according to claim 10, wherein when the support foot is unfolded completely, the indicating member triggers the alarm device to stop sending out the alarm message.

12. A safety seat base comprising:

a base body comprising a frame, the frame having an indicating window;

an indicating member rotatably connected to the frame, the indicating member including a first color block; and a support foot rotatably connected to the frame, the support foot having a protruding portion;

wherein when the support foot rotates to an unfolded position, the protruding portion pushes the indicating member to rotate upward, such that the indicating window shows the first color block, wherein the safety seat base further comprises:

a torsion spring, two ends of the torsion spring respectively abut against the support foot and the frame, and the torsion spring biases the support foot toward the unfolded position; or an elastic sheet, the elastic sheet is disposed on the frame, and the elastic sheet restrains the support foot from rotating toward the unfolded position.

13. A safety seat base comprising:

a base body comprising a frame, the frame having an indicating window;

an indicating member rotatably connected to the frame, the indicating member including a first color block; and a support foot rotatably connected to the frame, the support foot having a protruding portion;

wherein when the support foot rotates to an unfolded position, the protruding portion pushes the indicating member to rotate upward, such that the indicating window shows the first color block, wherein the safety seat base further comprises an alarm device and the alarm device is disposed on the base body; when the support foot is unfolded incompletely, the alarm device sends out an alarm message; when the support foot is unfolded completely, the alarm device stops sending out the alarm message.

* * * * *